United States Patent [19]
Schietecatte et al.

[11] Patent Number: 6,082,326
[45] Date of Patent: Jul. 4, 2000

[54] CONTROL METHOD

[75] Inventors: Thierry Schietecatte, Orleans; Guillaume Meissonnier, Reims, both of France

[73] Assignee: Lucas Industries plc, United Kingdom

[21] Appl. No.: 09/205,810

[22] Filed: Dec. 4, 1998

[30] Foreign Application Priority Data

Dec. 5, 1997 [GB] United Kingdom .................. 9725714

[51] Int. Cl.$^7$ .................................................. F02M 57/00
[52] U.S. Cl. .................... 123/299; 123/436; 123/479; 123/494; 701/107; 73/35.09
[58] Field of Search .................... 123/436, 456, 123/479, 494, 299, 300; 73/35.09; 701/107

[56] References Cited

U.S. PATENT DOCUMENTS

| | | | |
|---|---|---|---|
| 4,279,143 | 7/1981 | Guipaud | 73/35 |
| 4,895,121 | 1/1990 | McCoy et al. | 123/425 |
| 5,005,549 | 4/1991 | Pernpeintner et al. | 123/479 |
| 5,119,783 | 6/1992 | Komurasaki | 123/425 |
| 5,864,055 | 1/1999 | Burrione et al. | 73/35.09 |
| 5,945,596 | 8/1999 | Burkel et al. | 73/118.1 |

FOREIGN PATENT DOCUMENTS 2305727  9/1996  United Kingdom .

*Primary Examiner*—Henry C. Yuen
*Assistant Examiner*—Arnold Castro
*Attorney, Agent, or Firm*—Andrus, Sceales, Starke & Sawall

[57] ABSTRACT

A control method as described, the method being intended for use controlling the operation of a compression ignition internal combustion engine having an accelerometer associated therewith and arranged to sense vibrations of the engine, and a monitor arranged to monitor the output signal of the accelerometer, by monitoring the output signal during a detection time interval and a reference time interval, using the output signal during the reference time interval to compensate for background noise, and using the noise compensated signal in controlling the operation of the engine.

10 Claims, 7 Drawing Sheets

CONTROL METHOD

This invention relates to a method for use in controlling the operation of a compression ignition internal combustion engine. The control method is particularly useful for monitoring the engine for faults and for controlling the quantity of fuel delivered to the engine, in use. The invention is also applicable to controlling the quantity of fuel supplied during a pilot injection.

GB-A-2305727 describes an arrangement in which a sound sensor is mounted upon or associated with an engine. The output of the sensor is filtered and used to monitor movement of an injector needle and to monitor combustion. A method is described whereby the minimum drive pulse length which must be applied to an injector to cause the injector to open can be derived.

According to the present invention there is provided a control method for controlling the operation of a compression ignition internal combustion engine having an accelerometer associated therewith and arranged to sense vibrations of the engine, and monitor means arranged to monitor the output signal of the accelerometer, the method comprising the steps of monitoring the output signal during a detection time interval and during a reference time interval, using the output signal during the reference time interval to compensate for background noise, and using the noise compensated signal in controlling the operation of the engine.

The method of the invention is particularly suitable for controlling pilot injections of fuel, in which case the detection time interval occurs just before the top-dead-center position of a cylinder of the engine.

The method may be used to sense the delivery of too great a quantity of fuel or the delivery of fuel by a leaky fuel injector by sensing combustion abnormalities.

In order to sense for abnormalities resulting from abnormal combustion, the output signal of the accelerometer is conveniently filtered to include only vibrations of frequency falling within a specific frequency range within the range 6–10 kHz. The signal within a detection time interval or window just before the top-dead-center position of an engine cylinder is compared with that of a reference time interval or window where no combustion vibrations are present in order to compensate for background noise. Vibrations present in the detection window but not present in the reference window are indicative of a combustion abnormality, and if such vibrations are sensed, the control system is preferably arranged to output an indication to the effect that such an abnormality has been sensed.

Such an abnormality may be due, for example, to injector leakage caused by a sticking injector needle, or due to the delivery of too large a quantity of fuel during a pilot injection.

The method described hereinbefore may be used to limit the maximum pilot fuel quantity which can be injected without causing abnormal combustion by decreasing the quantity of fuel delivered in the pilot injection when combustion abnormalities are sensed.

Where the engine is of the type in which a pilot injection of fuel is delivered to a cylinder, the pilot injection being followed by a main injection, one cause of combustion abnormalities is that the pilot injection may be too large, too much fuel being delivered in the pilot injection. In such an engine, the control system may be used to control the size of the pilot injection.

The method of the invention may also or alternatively be used to determine the length of the minimum drive pulse which must be applied to an electromagnetically controlled injector to cause movement of the injector needle and hence injection of fuel. Vibrations which result from the movement of the injector needle typically occur in the range 15–20 kHz. By appropriate filtering of the output signal, the commencement of movement of the injector needle relative to the duration of the corresponding drive pulse can be determined.

The duration of the pilot pulse may be determined by adding a pulse of predetermined length to the minimum drive pulse or by subtracting a pulse of predetermined length from the maximum pilot pulse length.

If the maximum quantity of fuel, and corresponding drive pulse length, which can be delivered in a pilot injection without causing combustion abnormalities is known, and if the minimum drive pulse which causes fuel injection is known, then the pulse length for any fuel quantity up to the maximum can be derived.

The invention will further be described, by way of example, with reference to the accompanying drawings, in which.

Figure 1:
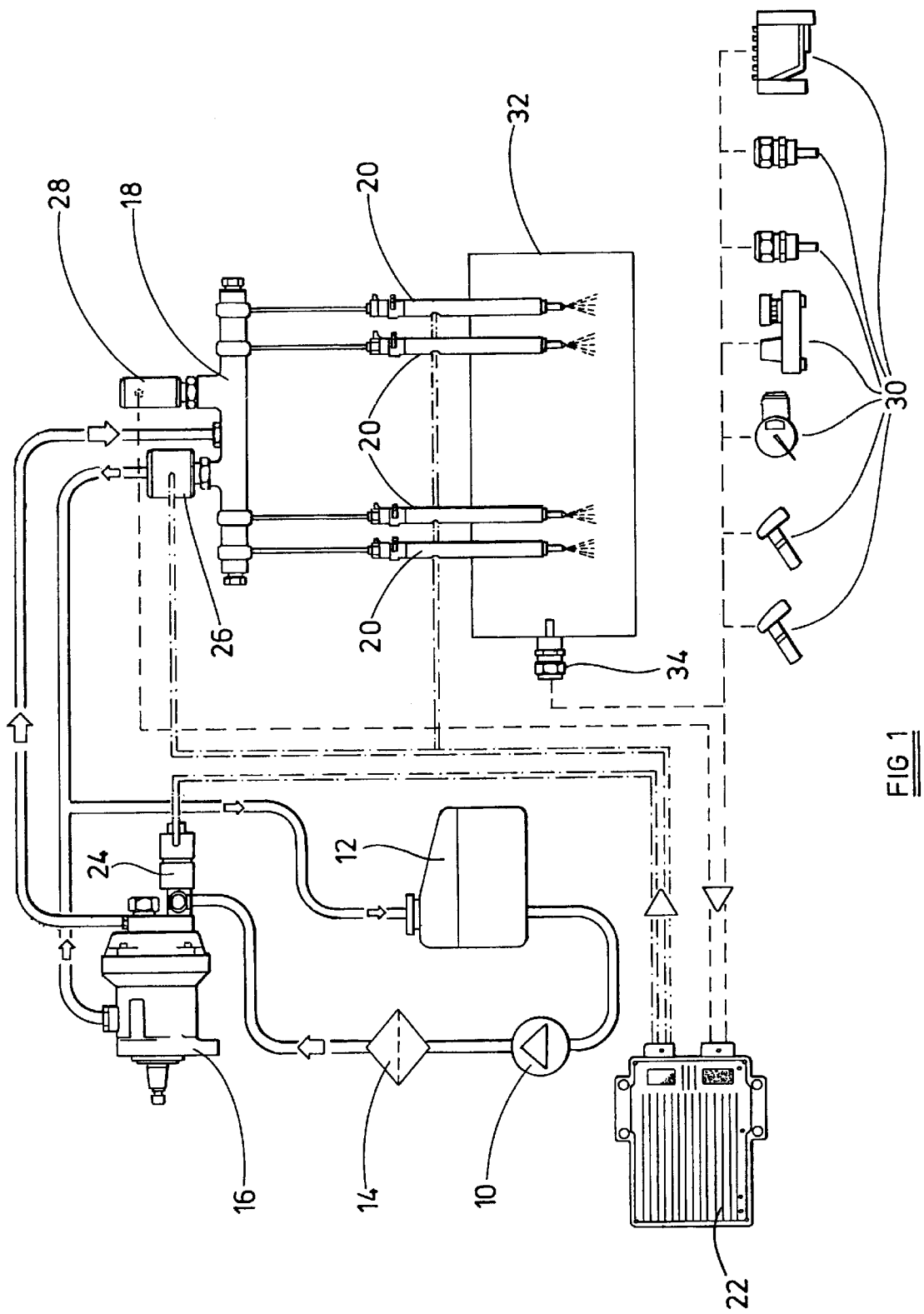
FIG. 1 is a diagrammatic illustration of an engine and fuel system incorporating a control system in accordance with an embodiment of the invention.

The engine and fuel system illustrated in FIG. 1 comprises a low pressure fuel pump 10 arranged to draw diesel fuel from a fuel reservoir 12, and supply the fuel through a filter 14 to an inlet of a high pressure fuel pump 16. The high pressure fuel pump 16 is arranged to charge a common rail 18 with fuel at high pressure. Connected to the common rail 18 is a plurality of injectors 20, each of the injectors 20 being electromagnetically actuable under the control of an electronic control unit 22. The electronic control unit 22 also controls the operation of the high pressure fuel pump 16 by controlling a throttle 24 thereof, and controls the fuel pressure within the common rail 18 by controlling the operation of a control valve 26, the electronic control unit 22 being supplied with information relating to the fuel pressure within the common rail 18 by a pressure sensor 28. In addition to receiving signals indicative of the fuel pressure within the common rail 18, the electronic control unit is supplied with signals indicative of a number of other engine parameters, for example engine speed and position, and accelerator pedal position, using appropriate sensors 30.

Fuel delivered by the injectors 20 is injected into respective cylinders of an associated engine 32, and as indicated in FIG. 1, the engine 32 has mounted thereon an acceleration sensor 34. The output signal from the acceleration sensor 34 is supplied to the electronic control unit and is used in controlling the operation of the engine.

Figure 2:
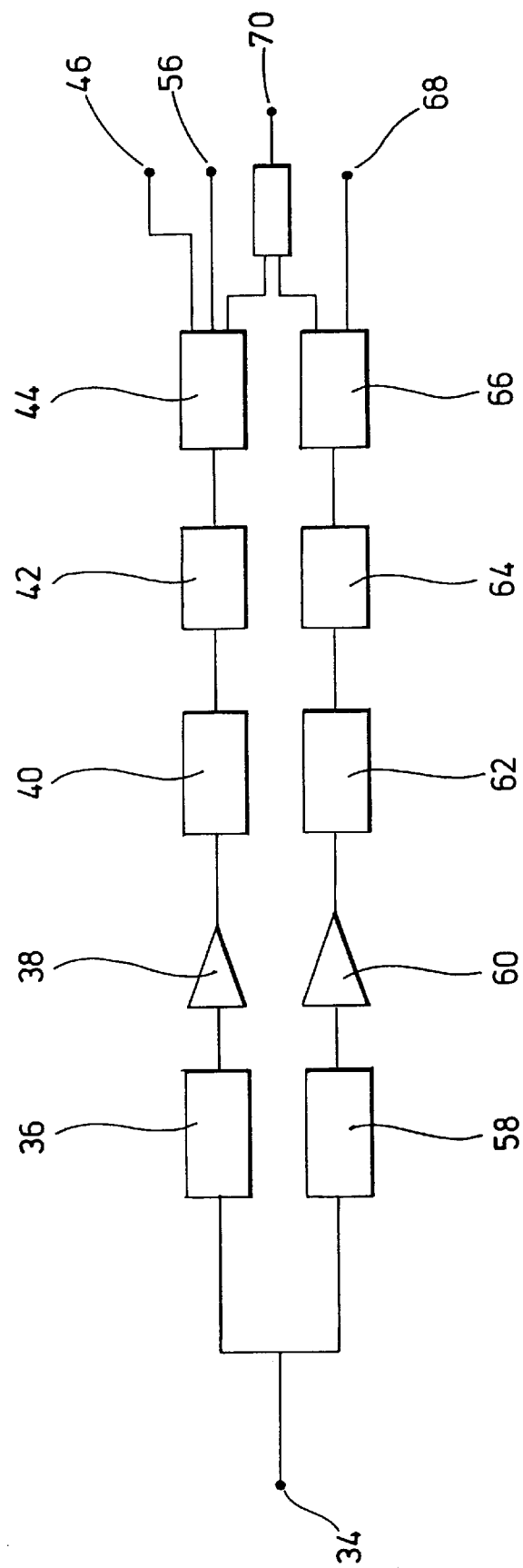
FIG. 2 is a diagram of the operation of the control system.

It will be appreciated that the electronic control unit 22 performs a large number of functions, and some of these functions are described hereinafter. As illustrated in FIG. 2, the output signal of the acceleration sensor 34 is passed through a bandpass filter 36 which is arranged to pass vibration signals of frequency falling within the range 6–8 kHz. The filtered signal is then amplified by an amplifier 38, full wave rectified by a rectifier 40, and the part of the signal falling within a detection time interval or window located just before the top-dead-center position for the cylinder for which the signal relates is integrated by an appropriate integration circuit 42. An identical integration process is performed on the amplified and full wave rectified signal falling within a reference time interval or window located in a part of the waveform in which it is known that no combustion vibrations will occur.

The output of the integration circuit 42 for both windows is supplied to a circuit 44 in which a ratio of the integral of the part of the signal falling within the detection window and the part falling within the reference window is calculated to compensate for background noise. As described hereinafter, where no abnormalities are occurring in the operation of the engine, the waveform within the detection window should be similar to that within the reference window, and the ratio calculated by the circuit 44 should be approximately equal to 1. If the ratio rises significantly above 1, then this is indicative that abnormal vibrations are occurring, and hence that a fault has occurred, and in FIG. 2, the presence of such a fault is transmitted to appropriate indicating means via output 46.

Figure 3:
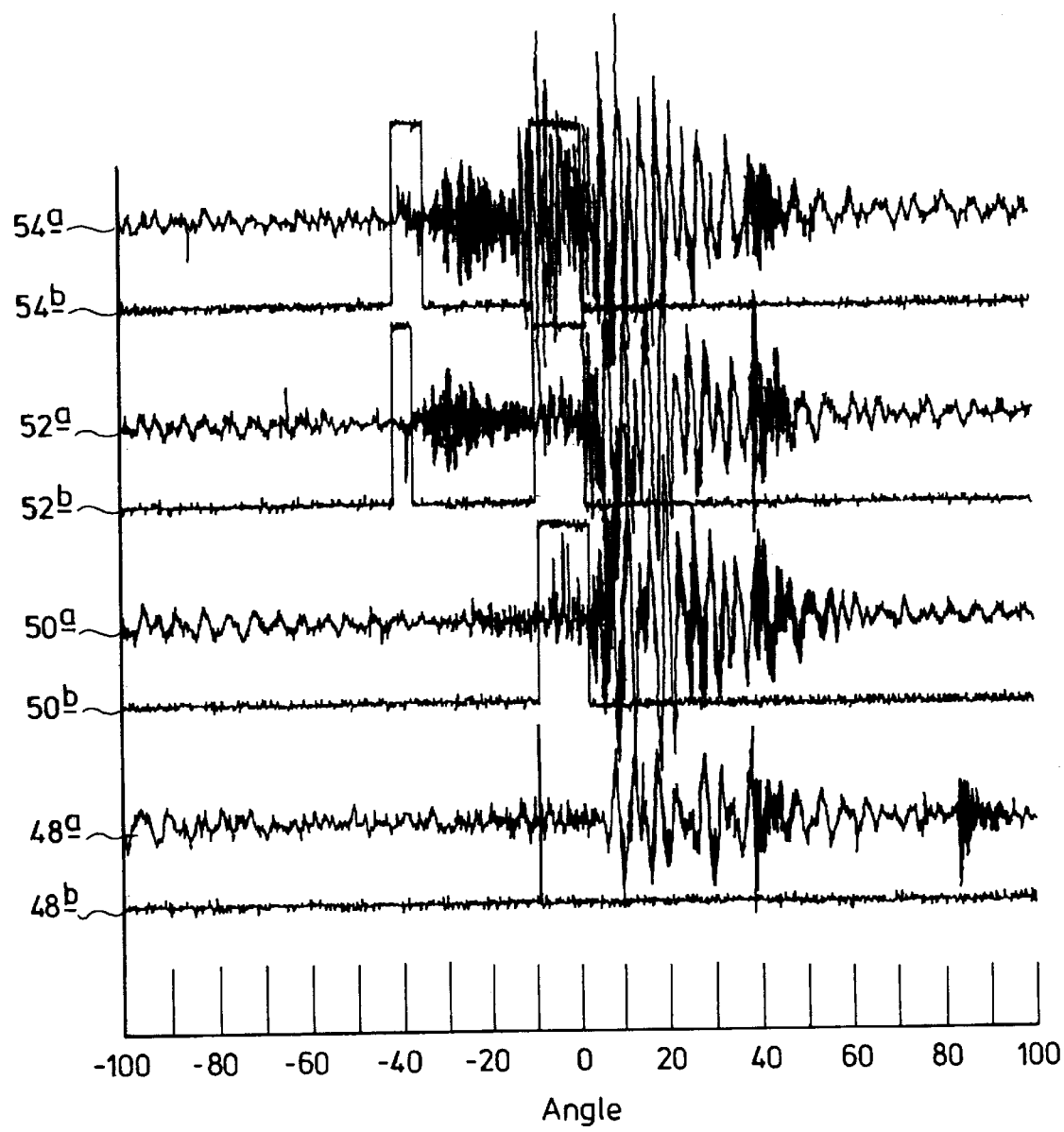
FIG. 3 is a graph illustrating four different injector control pulses and the corresponding output signals of the accelerometer.

FIG. 3 illustrates the output of the acceleration sensor 34 with no filtration applied where the injector is controlled using four different drive pulses. In FIG. 3, trace 48a indicates the signal produced where no actuating pulse is applied to the injector 20 as indicated by trace 48b. Trace 50a indicates the output of the acceleration sensor 34 where an injection pulse is applied to the injector 20 as indicated by trace 50b. Trace 52a shows the output signal from the acceleration sensor 34 where the injection pulse is preceded by a pilot injection pulse as indicated in trace 52b. Traces 54a and 54b are similar to traces 52a and 52b but show the result of increasing the duration of the pilot injection pulse. The traces shown in FIG. 4 are similar to those of FIG. 3, but the traces which relate to the output signals of the acceleration sensor 34 have been passed through the bandpass filter 36, thus only vibrations within the range 6–8 kHz are present.

Figure 4:
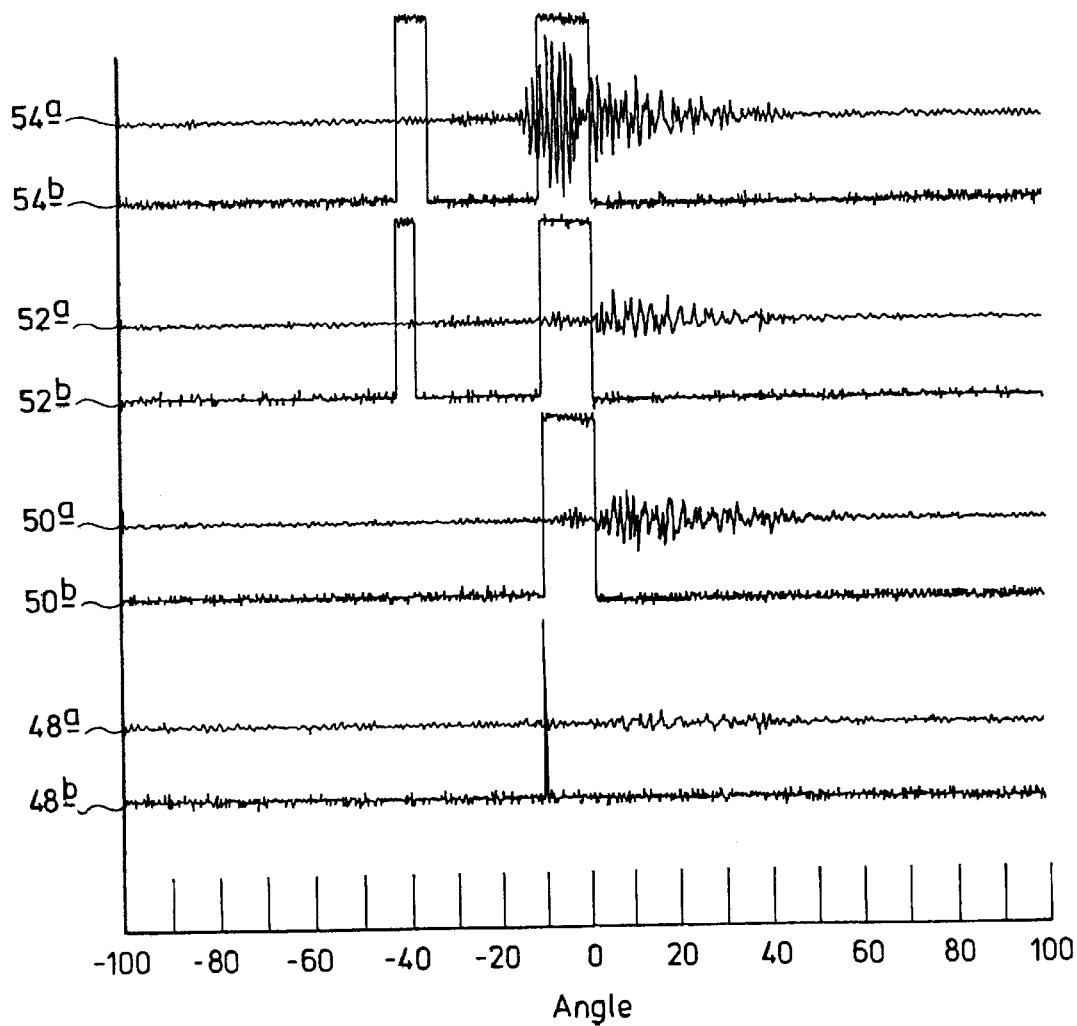
FIGS. 4 and 5 are graphs similar to FIG. 3 in which the output signals have been filtered by a 6–8 kHz bandpass filter and a 15–20 kHz bandpass filter, respectively.

As shown in FIG. 4, trace 54a differs from the other traces of the output of the acceleration sensor 34 in that a large vibration signal is present, the vibration signal occurring just prior to the top-dead-center position for the particular cylinder to which the traces relate. It has been found that this vibration signal occurs as a result of the presence of a combustion abnormality, for example resulting from the pilot injection being of too great a duration, and thus that too great a quantity of fuel is supplied to the cylinder during the pilot injection. Clearly, by comparing the filtered signal in the detection window just prior to top-dead-center with the corresponding result from the reference window, the detection of such an abnormal trace in the detection window can be observed, such observations resulting in the generation of the fault signal at the output 46. It will be appreciated that in these circumstances, the ratio is significantly greater than 1, and the increase in the value of the ratio can be used to generate the fault signal.

Rather than using the output of the circuit 44 simply to indicate that a fault is present, where the engine is of the type in which a pilot injection is supplied to the cylinder, the pilot injection being subsequently followed by a main injection, the output of the circuit 44 may be used to control the duration of the pilot injection to avoid the generation of such abnormalities as denoted by output 56 in FIG. 2. The avoidance of the generation of such abnormalities may be achieved using a closed loop technique whereby the electronic control unit 22 controls the duration of the pilot injection to maintain the ratio calculated using the circuit 44 at a predetermined level. Alternatively, an open loop technique may be used whereby upon the ratio rising to an unacceptably high level, modifications to the duration of the pilot injection are made to return the ratio to an acceptable level.

Figure 6:
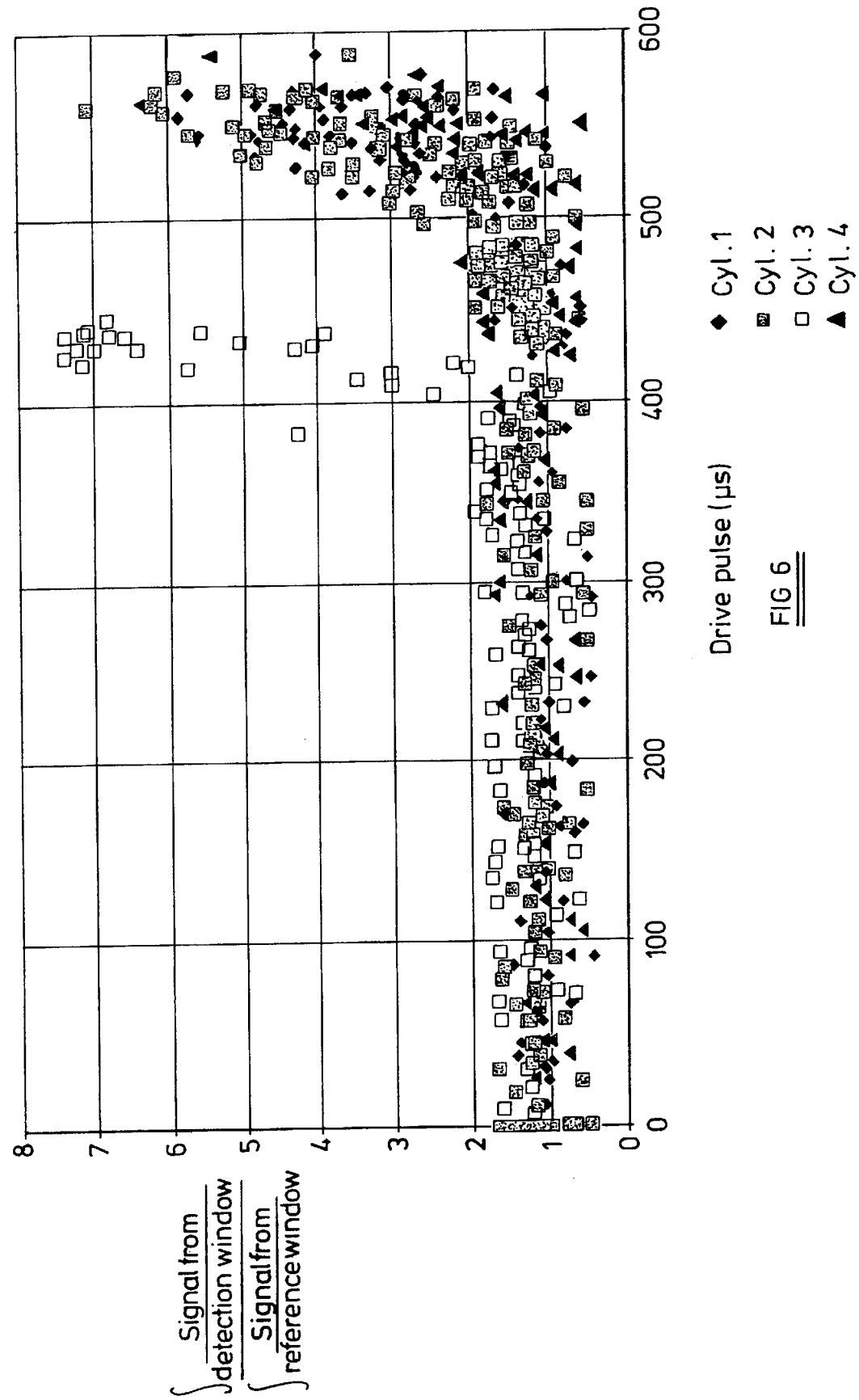
FIGS. 6 and 7 are graphs illustrating the operation of the control system.

FIG. 6 is a graph illustrating the effect of changing the duration of the drive pulse upon the value of the ratio for four different cylinders. It is clear from FIG. 6 that the value of the ratio where no abnormalities are occurring averages approximately 1, although clearly some scattering occurs, thus the presence of an abnormality may be identified by sensing the ratio rising to a level above, for example, approximately 2. FIG. 6 also shows that for three of the four cylinders, combustion abnormalities occur where the duration of the drive pulse of the pilot injection rises above, approximately 500 μs. However, for the injector located in cylinder 3, combustion abnormalities are occurring when the duration of the drive pulse for the pilot injection rises above, approximately, 400 μs. Clearly, FIG. 6 indicates that the injector located in cylinder 3 is operating differently from those located in the other cylinders, thus in order to ensure consistent efficient running of the engine, the engine control unit 22 must be arranged to modify the duration of the drive pulse for the pilot injection of the injector located in cylinder 3 relative to the drive pulses for the pilot injections of the other injectors.

As shown in FIG. 2, the output of the acceleration sensor 34 is also filtered by a bandpass filter 58 which is arranged to pass vibrations of frequency falling within the range 15–20 kHz, these signals being indicative of movement of the injector needle rather than indicative of combustion abnormalities. As with the output of the filter 36, the output of the bandpass filter 58 is amplified by an amplifier 60, full wave rectified by a rectifier 62 and integrated by an integration circuit 64, and circuit 66 is used to calculate a ratio of the integral of the part of the signal falling within a detection window and a part falling within a reference window.

Figure 5:
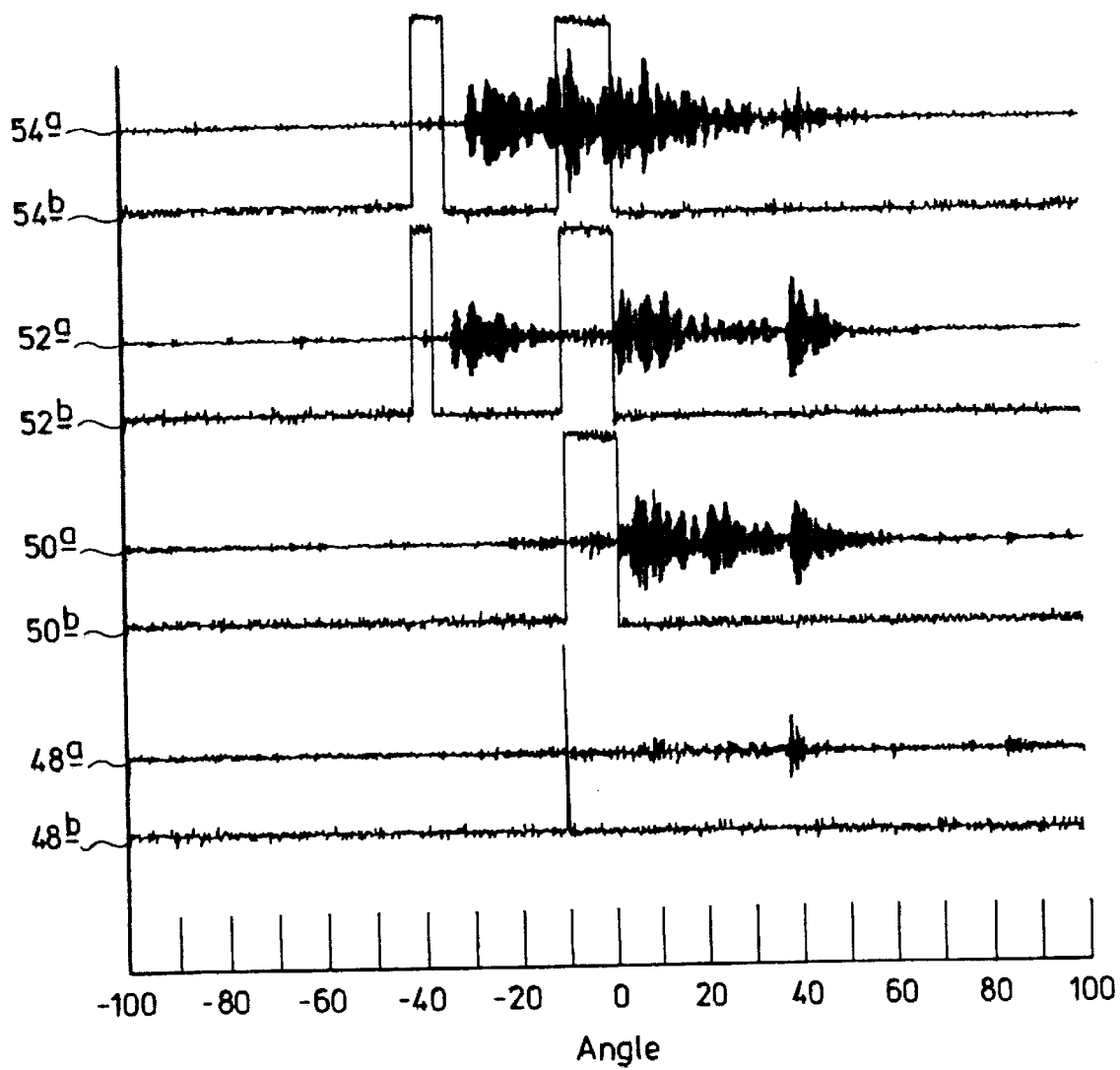

FIG. 5 is similar to FIGS. 3 and 4, the traces relating to the output of the acceleration sensor 34 showing only the vibrations which pass through the bandpass filter 58. Trace 48a which represents the filtered output of the acceleration sensor 34 where no injection is occurring is relatively flat, but clearly some noise is present. Trace 50a shows that, when injection occurs, a large number of vibrations occur shortly after top-dead-center which result from the movement of the injector needle during the main injection. Trace 52a includes substantially the same vibrations as those present in trace 50a, but supplemented by further vibrations which occur as a result of the movement of the injector needle during the pilot injection. Similarly, trace 54a shows vibrations which occur as a result of both the pilot and main injections.

Figure 7:
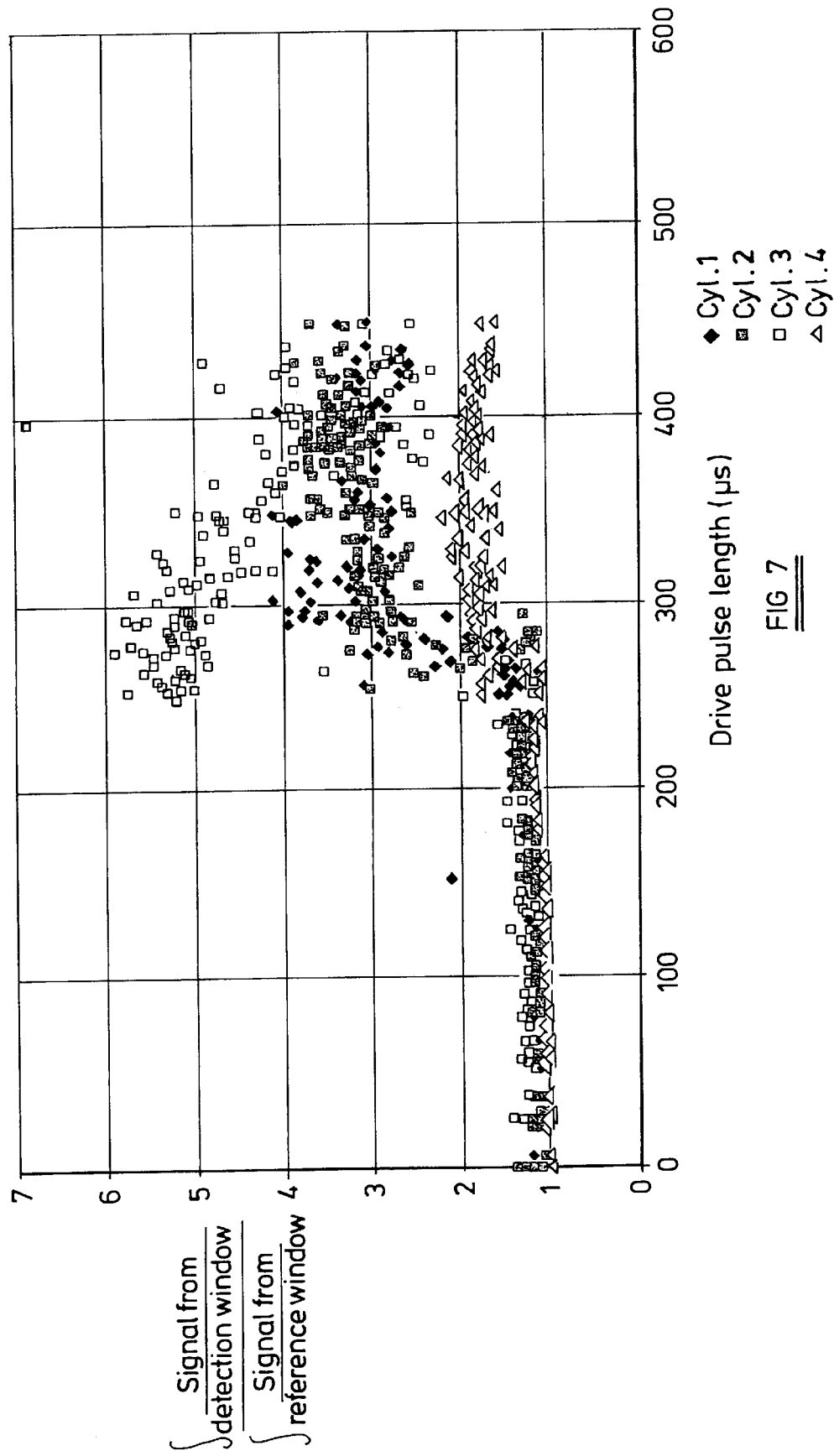

FIG. 7 is a graph illustrating the effect on the ratio calculated using the circuit 66 of varying the length of the drive pulse for the injectors associated with four different cylinders of an engine. Clearly, where the drive pulse is of length less than approximately 250 μs the ratio remains at a value slightly above 1. However, where the drive pulse length is increased above 250 μs, the ratio increases significantly indicating that movement of the injector needle has commenced. Clearly, therefore, the application of a drive pulse of duration less than 250 μs does not result in movement of the injector needle, thus does not result in injection occurring. In FIG. 2, output of circuit 66 is indicative of the minimum drive pulse duration necessary to cause injection.

The output of circuit 66 may be used to control the duration of the pilot injection to compensate for differences between injector characteristics. Once the minimum injection pulse is calculated for each injector, a predetermined pulse may be added to this value to obtain a pilot injection pulse. In practise, the minimum drive pulse length may be determined by applying an occasional pulse, for example post injection, and correcting the open loop characteristics for each injector.

Where the engine is of the type in which a pilot injection is supplied to the cylinders of the engine, each pilot injection being followed by a subsequent main injection, then the outputs of the circuits 44, 66 can be used to control the quantity of fuel supplied during the pilot injection to any desired amount. The output of the circuit 44 indicates the maximum duration of the pilot injection which does not result in the formation of combustion abnormalities, and the corresponding quantity of fuel delivered during this duration of pilot injection can be derived using appropriate tests, and the output of the circuit 66 provides an indication of the minimum drive pulse length which is necessary to cause injection to occur. By interpolation using these figures, if the desired quantity of fuel to be delivered during the pilot injection is known, the duration of the drive pulse necessary to cause injection of that quantity of fuel during the pilot injection can be derived, and in FIG. 2, this is indicated at output 70.

Although some of the description hereinbefore is directed specifically towards arrangements including a pilot injection and a subsequent main injection, it will be appreciated that some aspects of the invention are applicable to other types of engine and corresponding fuel supply system. For example, the fault detection technique could be used to detect faults which occur other than as a result of the pilot injection being of too great a duration.

We claim:

1. A control method for controlling the operation of a compression ignition internal combustion engine having an accelerometer associated therewith and arranged to sense vibrations of the engine, and monitor means arranged to monitor the output signal of the accelerometer, the method comprising the steps of monitoring the output signal during a detection time interval and a reference time interval, wherein the reference time interval occurs during a period in which no combustion variations occur, using the output signal during the reference time interval to compensate for background noise, and using the noise compensated signal in controlling the operation of the engine.

2. A control method as claimed in claim 1, wherein the detection time interval occurs just prior to a cylinder of the engine reaching its top-dead-center condition.

3. A control method as claimed in claim 1, further comprising a step of filtering the output signal.

4. A control method as claimed in claim 3, wherein the filtering step is arranged to remove from the output signal components other than those indicative of combustion abnormalities.

5. A control method as claimed in claim 4, wherein the filtering step is arranged to retain components of frequency falling within a specific band within the range 6–10 kHz.

6. A control method as claimed in claim 4, wherein if vibrations indicative of a combustion abnormality are sensed, a warning signal is produced.

7. A control method for controlling the operation of a compression ignition internal combustion engine having an accelerometer associated therewith and arranged to sense vibrations of the engines, and monitor means arranged to monitor the output signal of the accelerometer, the method comprising the steps of monitoring the output signal during a detection time interval and a reference time interval, wherein the detection time interval occurs just prior to a cylinder of the engine reaching its top-dead-center condition, filtering the output signal, wherein the filtering step is arranged to remove from the output signal components other than those indicative of combustion abnormalities, using the output signal during the reference time interval to compensate for background noise, and using the noise compensated signal in controlling the operation of the engine, further comprising the step of varying the quantity of fuel supplied during the pilot injection when a combustion abnormality is sensed in order to determine the maximum quantity of fuel which is permitted during a pilot injection.

8. A control method for controlling the operation of a compression ignition internal combustion engine having an accelerometer associated therewith and arranged to sense vibrations of the engine, and monitor means arranged to monitor the output signal of the accelerometer, the method comprising the steps of monitoring the output signal during a detection time interval and a reference time interval, wherein the detection time interval occurs just prior to a cylinder of the engine reaching its top-dead-center condition, filtering the output signal using the output signal during the reference time interval to compensate for background noise, and using the noise compensated signal in controlling the operation of the engine, wherein the filtering step is arranged to remove from the output signal components other than those indicative of injector needle movement.

9. A control method as claimed in claim 8, wherein the filtering step is arranged to remove components of frequency falling outside of the range 15–20 kHz.

10. A control method as claimed in claim 8, further comprising the step of modifying the duration of a drive pulse applied to an injector in order to determine the minimum drive pulse duration necessary to cause needle movement.

\* \* \* \* \*